(12) United States Patent
Burford et al.

(10) Patent No.: US 10,778,525 B2
(45) Date of Patent: Sep. 15, 2020

(54) MEASURING THE PERFORMANCE OF COMPUTING RESOURCES

(71) Applicant: International Business Machines Corporation, Armonk, NY (US)

(72) Inventors: Richard A. Burford, Sandy, UT (US); Scot W. Dixon, Manning (AU); Christopher R. Walker, Raleigh, NC (US); Mark N. Weatherill, Lathlain (AU)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 15/098,614

(22) Filed: Apr. 14, 2016

(65) Prior Publication Data
US 2017/0302518 A1    Oct. 19, 2017

(51) Int. Cl.
*H04L 12/24* (2006.01)
*H04L 12/26* (2006.01)
*G06F 11/34* (2006.01)
*G06F 11/30* (2006.01)

(52) U.S. Cl.
CPC ...... *H04L 41/0853* (2013.01); *G06F 11/3006* (2013.01); *G06F 11/3452* (2013.01); *H04L 43/04* (2013.01)

(58) Field of Classification Search
CPC ....... H04L 41/0853; H04L 43/04; G06F 11/00
See application file for complete search history.

(56) References Cited

U.S. PATENT DOCUMENTS

| | | | |
|---|---|---|---|
| 7,817,578 B2 | 10/2010 | Bivens et al. | |
| 8,595,369 B2 | 11/2013 | Wexler et al. | |
| 8,832,665 B2 | 9/2014 | Greifeneder et al. | |
| 2007/0136312 A1* | 6/2007 | Shulman | G06F 21/55 |
| 2009/0125532 A1* | 5/2009 | Wexler | G06F 17/30483 |
| 2012/0150880 A1* | 6/2012 | Ben-Natan | H04L 69/22 |
| | | | 707/755 |
| 2013/0290476 A1 | 10/2013 | Trugman | |
| 2014/0310392 A1* | 10/2014 | Ho | H04L 69/16 |
| | | | 709/223 |

* cited by examiner

*Primary Examiner* — Caroline H Jahnige
(74) *Attorney, Agent, or Firm* — Edward J. Wixted, III

(57) ABSTRACT

A computer-implemented method includes identifying one or more client-based data artefacts associated with a client device, identifying one or more backend configuration data artefacts associated with a backend device, and identifying one or more backend configuration correlation guidelines. The computer-implemented method further includes determining one or more configuration correlation conclusions based on the one or more client-based data artefacts, the one or more backend configuration data artefacts, and the one or more backend configuration correlation guidelines. A corresponding computer program product and computer system are also disclosed.

20 Claims, 8 Drawing Sheets

```
1. POST /login
2. User-Agent: Browser/1.0
3. HOST: www.website.example/examplepage?clientID=1000
                                                    411
4. Content-Length = 60,
5. username: admin  413
6. password: abc123
```

FIG. 4A

```
1. GET /music
2. User-Agent: Music_Player/1.0
3. HOST: www.website.example/music?clientID=2000,musicID=112
                                                           411
4. Content-Length = 600,
                  413
```

FIG. 4B

```
1. GET /image
2. User-Agent: Image_Browser/1.0
3. HOST: www.website.example/image?clientID=3000,imageID=333
                                                           411
4. Content-Length = 100,
                  413
```

FIG. 4C

| Client ID 411 | Client Service Request Data 210 | Content Length 413 | Other Data 514 |
|---|---|---|---|
| 1000 | Webpage_Browsing —— 550<br>Login_Authentication —— 551 | 60 | UA: Browser/1.0<br>username: admin<br>password: abc123 |
| 2000 | Music_Play —— 552 | 600 | UA: Music_Player/1.0<br>musicID = 112 |
| 3000 | Image_Display —— 553 | 100 | UA: Image_Browser/1.0<br>imageID = 333 |

FIG. 5

| Backend Resource 611 | Service Delivery Data Artefacts 612 | Other Configuration Data 613 |
|---|---|---|
| Web Server —— 650 | Webpage_Browsing —— 550 | |
| Authentication DB Server —— 651 | Login_Authentication —— 551 | |
| Music DB Server —— 652 | Music_Play —— 552 | |
| Image DB Server —— 653 | Image_Display —— 553 | |

FIG. 6

MEASURING THE PERFORMANCE OF COMPUTING RESOURCES

BACKGROUND

The present invention relates generally to the field of performance measurement of computing resources, and more particularly to performance measurement in the context of client-server software systems.

The client-server architecture is a prevalent software architecture used in many network applications. In such systems, a client computing device communicates with a server computing device to obtain one or more computing services. Measuring the performance of computing resources in such systems may be difficult or costly because of the distributed nature of the computing environment in such systems. Users and developers of client-server software systems continue to face challenges with the costs and difficulties of accurately and effectively measuring the performance of computing resources in those systems.

SUMMARY

A computer-implemented method includes identifying one or more client-based data artefacts associated with a client device, identifying one or more backend configuration data artefacts associated with a backend device, and identifying one or more backend configuration correlation guidelines. The computer-implemented method further includes determining one or more configuration correlation conclusions based on the one or more client-based data artefacts, the one or more backend configuration data artefacts, and the one or more backend configuration correlation guidelines. A corresponding computer program product and computer system are also disclosed.

BRIEF DESCRIPTION OF THE DRAWINGS

FIGS. 4A, 4B, and 4C are operational examples of hypertext transfer protocol requests, in accordance with at least one embodiment of the present invention.

FIG. 5 is an operational example of client-based data artefacts, in accordance with at least one embodiment of the present invention.

FIG. 6 is an operational example of backend configuration data artefacts, in accordance with at least one embodiment of the present invention.

DETAILED DESCRIPTION

Figure 1:
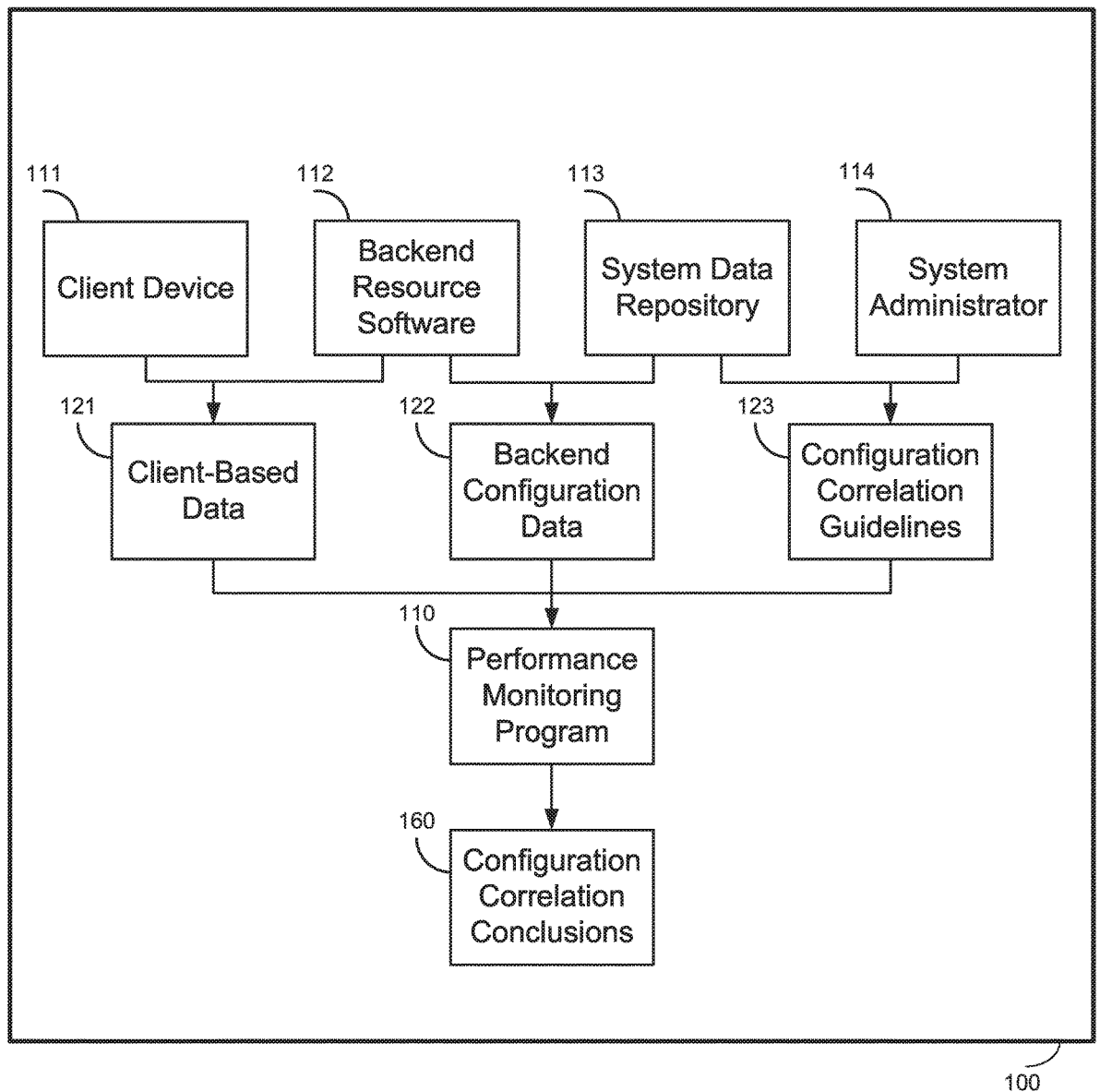
FIG. 1 is a block diagram of one embodiment of a computer system environment suitable for operation of a performance monitoring program, in accordance with at least one embodiment of the present invention.

FIG. 1 is a block diagram of a computer system environment 100 suitable for operation of a performance monitoring program 110, in accordance with at least one embodiment of the present invention. In the computing system environment depicted in FIG. 1, the program 110 obtains one or more client-based data artefacts 121 from a client device 111 and a backend resource software 112. In at least some embodiments, a client-based data artefact 121 is any data artefact that (directly or when analyzed and in whole or in part) provides at least one piece of information about one property (e.g., one or more of identity, location, service request, user agent software, operating system, and/or device type) associated with the client device 111. In at least some embodiments, a client device is a device that (directly or when analyzed and in whole or in part) issues a request to another device for the provision of a service and/or receipt of at least one data artefact. In at least some embodiments, a backend resource software 112 is any combination of one or more of at least one web server software, at least one application server software, at least one middleware software involved in at least one client-server system, at least one software supporting at least one backend software application, and at least one software extracting one or more data artefacts from at least one back-end application. Examples of backend resource software 112 include one or more of at least one application server middleware (such as IBM® Consumer Information Control System), at least one application server connector (such as IBM® z/OS® Connect), at least one database server middleware (such as IBM® Information Management System), and at least one database server mobile access interface (such as IBM® Information Management System Connect), and at least one service registry (such as IBM® WebSphere® Service Registry and Repository). In at least some embodiments, the program 110 receives one or more configuration data from one or more backend resource software frameworks 112.

In the computer system environment 100 depicted in FIG. 1, the performance monitoring program 110 obtains one or more backend configuration data artefacts 122 from the backend resource software 112 and a system data repository 113. In at least some embodiments, a backend configuration data artefact 122 is any data artefact that (directly or when analyzed and in whole or in part) provides at least one piece of information about one or more services provided by a computing device (i.e., a backend device), such as a server-side computing device. In at least some embodiments, system data repository 113 is any collection of one or more data artefacts (stored in a centralized and/or distributed manner) associated with the computer system environment 100 in which the program 110 operates and that is (directly or when analyzed and in whole or in part) available to the program 110.

In the computer system environment 100 depicted in FIG. 1, the performance monitoring program 110 obtains one or more configuration correlation guidelines 123 from the system data repository 113 and a system administrator 114. In at least some embodiments, a configuration correlation guideline 123 is any one or more computer instructions that (directly or when analyzed and in whole or in part) determine whether the client device 111 is associated with one or more computing resources associated with the backend device (not shown). In at least some embodiments, a system administrator 114 is any user of the computer system environment 100 that is permitted to create at least one configuration correlation guideline 123.

In the computer system environment 100 depicted in FIG. 1, the performance monitoring program 110 uses the client-based data 121, the backend configuration data 122, and the configuration correlation guidelines 123 to determine one or more configuration correlation conclusions 160. In at least some embodiments, a configuration correlation conclusion 160 is a collection of one or more data artefacts that (directly or when analyzed and in whole or in part) indicate whether the client device 111 is associated with one or more computing devices associated with the backend device (not shown).

Figure 2:
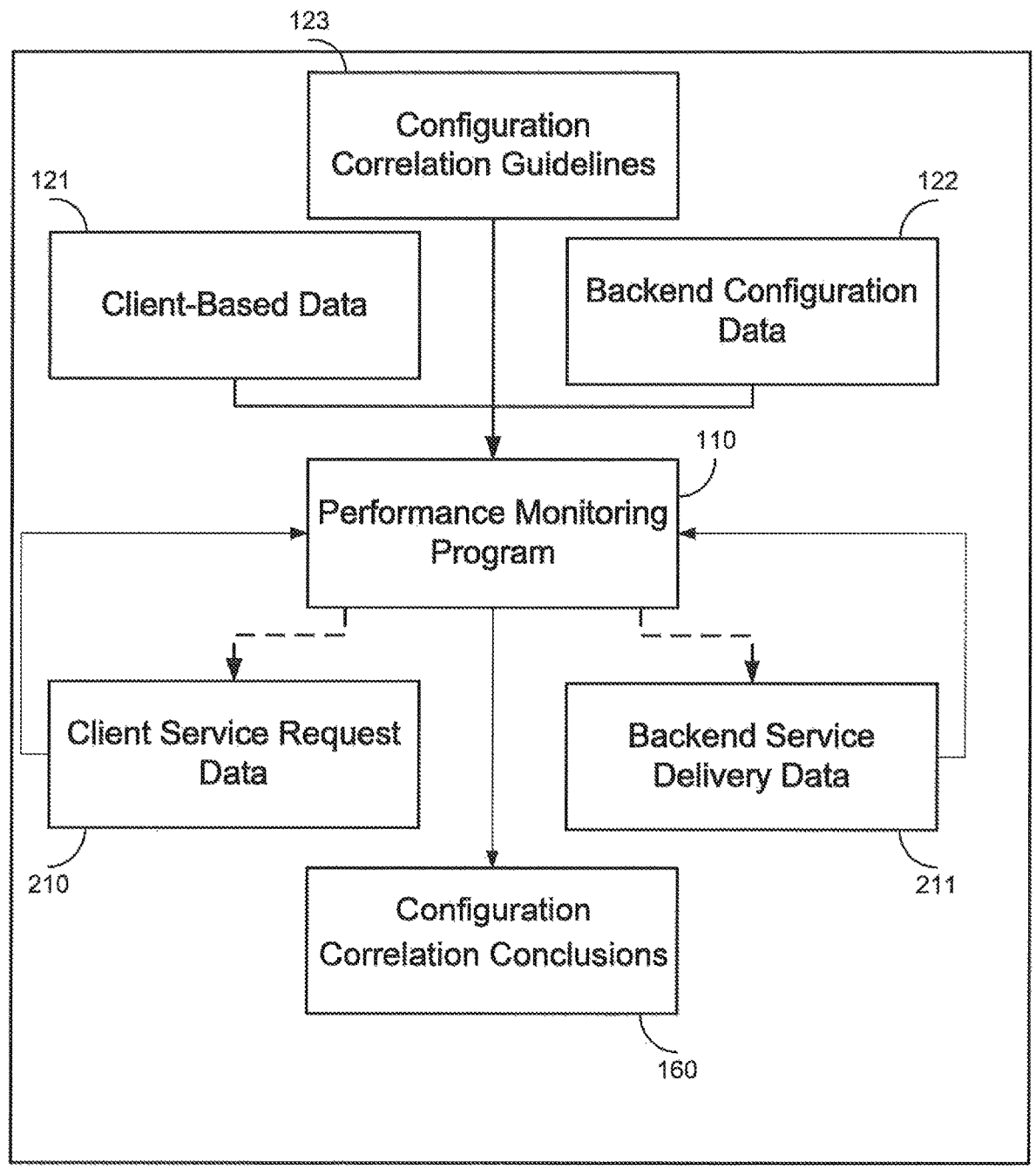
FIG. 2 is a data-flow diagram of a performance monitoring program, in accordance with at least one embodiment of the present invention.

FIG. 2 is a data-flow diagram of a performance monitoring program 110, in accordance with at least one embodiment of the present invention. In the embodiment depicted in FIG. 2, the program 110 determines at least one client service request data artefact 210 from the one or more client-based data artefacts 121. In at least some embodiments, a client service request data artefact 210 is any data artefact that (directly or when analyzed and in whole or in part) indicates a determination as to one or more properties (e.g., one or more of type, source of data, level of urgency, and input data artefacts) associated with at least one service requested by the client device 111 to the backend device (not shown).

In the embodiment depicted in FIG. 2, the program 110 determines at least one backend service delivery data artefact 211 from the one or more backend configuration data artefacts 122. In at least some embodiments, a backend service delivery data artefact 211 is any data artefact that (directly or when analyzed and in whole or in part) indicates a determination as to one or more properties (e.g., one or more of type, input data artefacts, output data artefacts, and replication rate) associated with at least one service provided by a computing resource associated with the backend device (not shown) in regular, non-exceptional executions. In the computing environment depicted in FIG. 2, the program compares the at least one client service request data artefact 210 and the at least one backend service delivery data artefact 211 using at least one configuration correlation guideline 123 to determine one or more configuration correlation conclusions 160.

Figure 3:
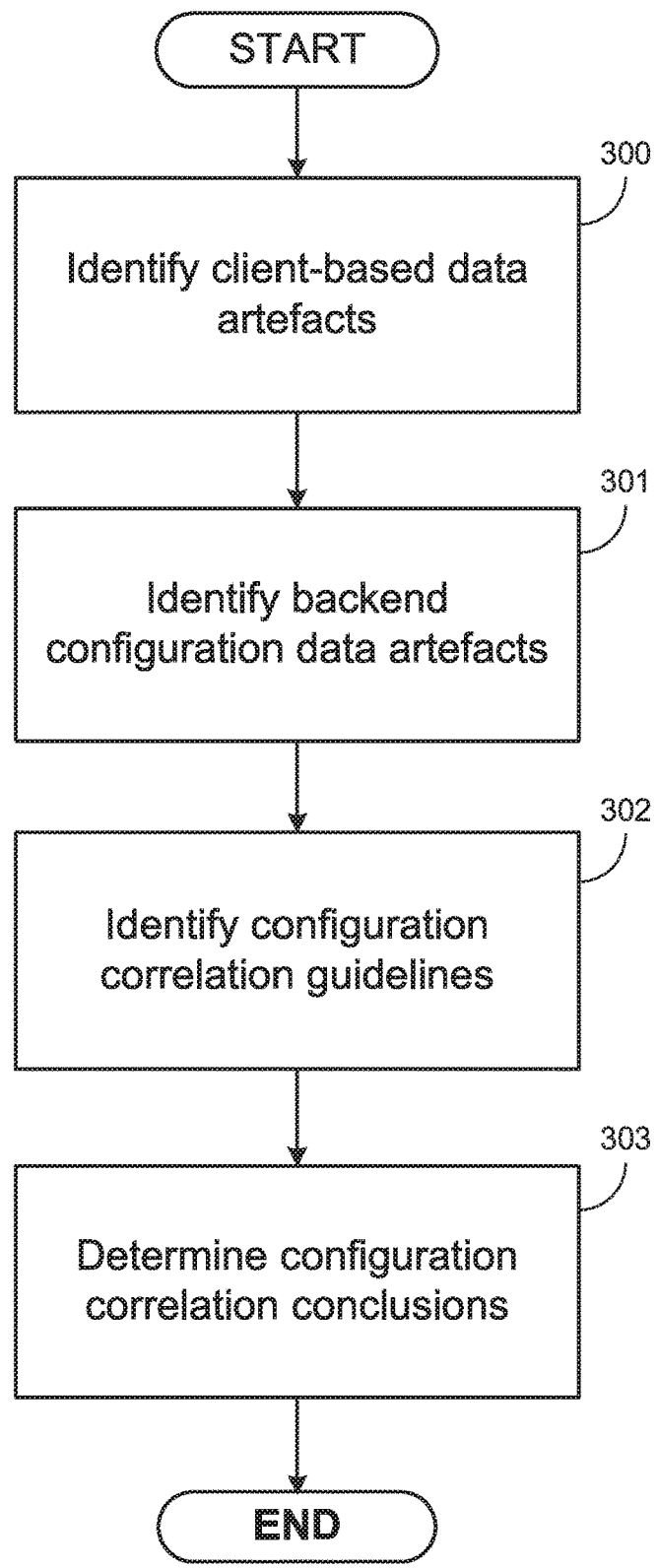
FIG. 3 is a flow-chart diagram of a performance monitoring program, in accordance with at least one embodiment of the present invention.

FIG. 3 is a flow-chart diagram of a performance monitoring program, in accordance with at least one embodiment of the present invention. At step 300, the program identifies one or more client-based data artefacts associated with a client device. At step 301, the program identifies one or more backend configuration data artefacts associated with a configured backend device. At step 302, the program identifies one or more backend configuration correlation guidelines. At step 303, the program determines one or more configuration correlation conclusions based on the one or more client-based data artefacts, the one or more backend configuration data artefacts, and the one or more backend configuration correlation guidelines.

The performance monitoring program identifies one or more client-based data artefacts at step 300. In some embodiments, identifying the one or more client-based data artefacts comprises: (i) identifying a hypertext transfer protocol (HTTP) request associated with the client device; (ii) determining one or more client-based data indications based on the HTTP request; and (iii) determining the one or more client-based data artefacts based on the one or more client-based data indications. In at least some embodiments, a client-based data indication is any one or more data indications (e.g., one or more parts of a HTTP request) that can be used to (directly or when analyzed and in whole or in part) determine at least one client-based data artefact. In some embodiments, the program identifies one or more client-based data artefacts through a HTTP request header.

In some embodiments, the performance monitoring program identifies one or more client-based data artefacts by instrumenting (i.e., injecting, inserting and/or gathering data from) one or more applications utilized by the client device (e.g., to insert client data not inserted by default into the service requests by those applications). In some embodiments, the program identifies one or more client-based data artefacts by determining those data artefacts using at least one collector or data instrumentation application. In some embodiments, the program identifies one or more client-based data artefacts by obtaining one or more indications of client data on the client device. In some embodiments, the program identifies one or more client-based data artefacts by obtaining one or more indications of client data at points in network traffic other than on the client device (i.e., through port mirroring).

In some embodiments, the performance monitoring program identifies one or more client-based data artefacts by analyzing, processing, and/or filtering client data indications (e.g., pre-processed, pre-analyzed, and/or pre-organized client data indications, for instance gathered by at least one geographically localized collection agent software framework that collects such client data indications). In some embodiments, the program only uses a part and/or segment of those client data indications (e.g., the part and/or segment of client data indications from a particular client device type and/or pertaining to a particular type of client-based data artefact). In some embodiments, the program identifies one or more client-based data artefacts using at least one of one or more plug-ins, one or more call-backs, one or more exits, and one or more log scrapers (e.g., log scrappers which collect and push data to a system that stores and forwards the data to the data gathering center associated with the program). In some embodiments, the program stores client-based data artefacts in at least one data gathering center associated with the program (in a centralized or distributed manner).

The performance monitoring program identifies one or more backend configuration data artefacts at step 301. In some embodiments, the program identifies one or more backend configuration data artefacts using inputs from one or more of at least one application server middleware (such as IBM® Consumer Information Control System), at least one application server connector (such as IBM z/OS® Connect), at least one database server middleware (such as IBM® Information Management System), and at least one database server mobile access interface (such as IBM® Information Management System Connect), and at least one service registry (such as IBM® WebSphere® Service Registry and Repository). In some embodiments, the program identifies one or more backend configuration data artefacts by analyzing, processing, and/or filtering indications of backend configuration data artefacts (e.g., pre-processed, pre-analyzed, and/or pre-organized indications of backend configuration data artefacts, for instance gathered by at least one geographically localized collection agent software framework that collects such indications). In some embodiments, the program stores backend configuration data artefacts in at least one data gathering center associated with the program (in a centralized or distributed manner).

The performance monitoring program identifies one or more backend configuration correlation guidelines at step 302. In some embodiments, at least one backend configuration correlation guidelines are supplied by at least one user of the computing system environment in which the program operates. In some embodiments, at least one backend configuration correlation guideline is based on the type of service requested by the client device and/or delivered by the configured backend device in regular, non-exceptional operations. In some embodiments, at least one backend configuration correlation guideline is based on the type and/or location of data accessed by the client device request. In some embodiments, the program stores an indication of at least one backend configuration correlation guideline in a storage location accessible to an analytics engine associated with the program.

The performance monitoring program determines one or more configuration correlation conclusions at step 303. In some embodiments, the one or more client-based data artefacts comprise at least one client service request data artefact and the one or more backend configuration data artefacts comprise at least one backend service delivery data artefact. In at least some of those embodiments, determining the one or more configuration correlation conclusions is performed based on the at least one client service request data artefact and the at least one backend service delivery data artefact (e.g., based on whether the at least one client service request data artefact and the at least one backend service delivery data artefact correspond to each other according to the one or more backend configuration correlation guidelines). In some embodiments, the one or more client-based data artefacts comprise at least one client input data artefact; and determining the or more configuration correlation conclusions is performed based on the at least one client input data artefact (based on at least one property, such as the type and/or location, of one or more server-side data artefacts affected by the client request as identified by the at least one client input data artefact). In at least some embodiments, a client input data artefact is any data artefact supplied (directly or when analyzed and in whole or in part) by the client device as an input to at least one service requested from the configured backend device. Examples of client input data artefacts include the inputs supplied as a query string in an HTTP request. In at least some embodiments, the program determines the one or more configuration correlation conclusions at least in part in an analytics engine associated with the program.

FIGS. 4A, 4B, and 4C are operational examples of hypertext transfer protocol (HTTP) requests, in accordance with at least one embodiment of the present invention. In the HTTP request depicted in FIG. 4A, a client device requests a login (using a HTTP POST request to a service identified as/login in line 1) using a user agent Browser/1.0 identified in line 2 to a host identified in line 3, with the content length 413 of 60 identified in line 4, the username "admin" identified in line 5, and the password "abc123" identified in line 6. The host identification in line 3 includes the following client input data artefact supplied as a query string (i.e., supplied after the "?" sign) to the server address: clientID 411 (e.g., indicating an identifying indication associated with the client device) of 1000.

In the HTTP request depicted in FIG. 4B, a client device requests the delivery of a music file (using a HTTP GET request to a service identified as/music in line 1) using a user agent Music_Player/1.0 identified in line 2, a host identified in line 3, and a content length 413 of 600 identified in line 4. The host address in line 3 includes the following two client input data artefacts: clientID 411 of 2000 and musicID (e.g., indicating an identifying indication associated with the music work requested) of 112. In the HTTP request depicted in FIG. 4C, a client device requests the delivery of an image file (using a HTTP GET request to a service identified as /image in line 1) using a user agent Image_Browser/1.0 identified in line 2, a host identified in line 3, and a content length 413 of 100 identified in line 4. The host address in line 3 includes the following two client input data artefacts: clientID 411 of 3000 and imageID (e.g., indicating an identifying indication associated with the image work requested) of 333.

FIG. 5 is an operational example of client-based data artefacts, in accordance with at least one embodiment of the present invention. In the embodiment depicted in FIG. 5, the client ID 411 is the identifying indication associated with a client device; client service request data artefact 210 is the identifying indication associated with the service requested by the client device; content length 413 is an indication of the length of the content transmitted by the client device through an HTTP request; and other data 514 comprises indications of any other data artefacts contained in the HTTP request (e.g., user agent and client input data artefacts).

In the embodiment depicted in FIG. 5, the client device associated with a client ID 411 of 1000 is determined to have requested the following client service requests 210: Webpage_Browsing 550 and Login_Authentication 551. The HTTP request associated with the client device 1000 has the content length 60. The client device 1000 uses the UA (i.e., user agent) Browser/1.0. The client device 1000 has supplied the username "admin" and the password "abc123."

In the embodiment depicted in FIG. 5, the client device associated with a client ID 411 of 2000 is determined to have requested the client service request 210 Music_Play 552. The HTTP request associated with the client device 2000 has the content length 600. The client device 2000 uses the UA Music_Player1/.0. The client device 2000 has supplied the musicID 112. In the embodiment depicted in FIG. 5, the client device associated with a client ID 411 of 3000 is determined to have requested the client service request 210 Image_Display 553. The HTTP request associated with the client device 3000 has the content length 100. The client device 3000 uses the UA Image_Browser/1.0. The client device 3000 has supplied the imageID 333.

FIG. 6 is an operational example of backend configuration data artefacts, in accordance with at least one embodiment of the present invention. The table depicted in FIG. 6 depicts the service delivery data artefact 612 associated with a backend resource 611 as well as any other configuration data artefacts 613 associated with that backend resource 611. In the embodiment depicted in FIG. 6, backend resource 611 web server 650 is associated with service delivery data artefact 612 Webpage_Browing 550; backend resource 611 authentication database server 651 is associated with service delivery data artefact 612 Login_Authentication 551; backend resource 611 music database server 652 is associated with service delivery data artefact 612 Music_Play 552; and backend resource 611 image database server 653 is associated with service delivery data artefact 612 Image_Display 553.

Figure 7:
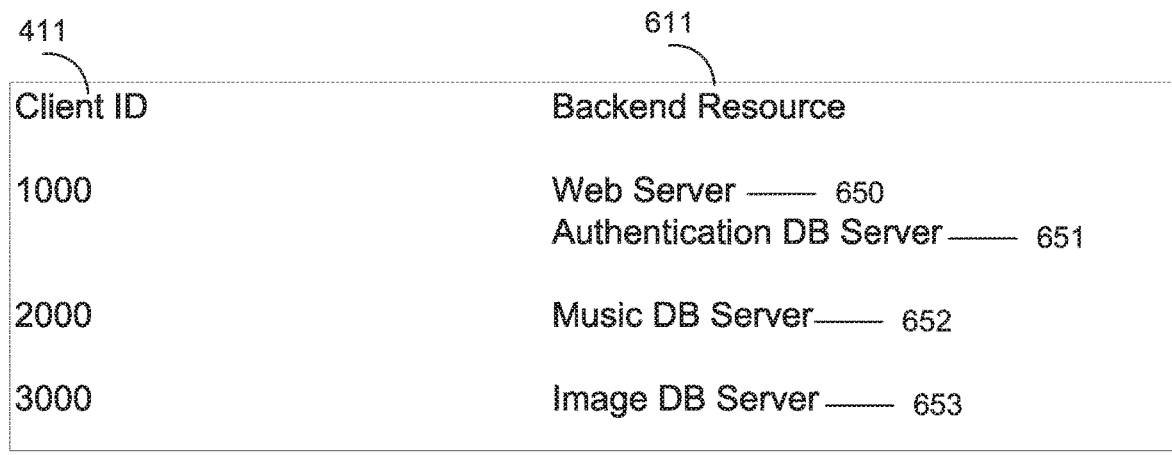
FIG. 7 is an operational example of configuration correlation conclusions, in accordance with at least one embodiment of the present invention.

FIG. 7 is an operational example of configuration correlation conclusions, in accordance with at least one embodiment of the present invention. The configuration correlation conclusions depicted in FIG. 7 were determined based on a backend configuration correlation guideline that instructs a performance monitoring program to determine that a client device is associated with a backend resource 611 if the client service request data artefact associated with the client device is the same as the service delivery data associated with the backend resource 611. In the embodiment depicted in FIG. 7, the client with a client ID 411 of 1000 is associated with backend resource 611 web server 650 (because the client device 1000 has requested and web server 650 delivers the service Webpage_Browsing 550) and backend resource 611 authentication database server 651 (because the client device 1000 has requested and authentication database server 651 delivers the service Login_Authentication 551). The client with client ID 411 of 2000 is associated with backend resource 611 music database server 652 (because the client device 2000 has requested and music database server 652 delivers the service Music_Play 552). The client with client ID 411 of 3000 is associated with backend resource 611 image database server 653 (because the client device 3000 has requested and image database server 653 delivers the service Music_Display 553).

In some embodiments, the performance monitoring program further comprises: (i) identifying one or more backend performance data artefacts associated with a monitored backend device; (ii) identifying one or more backend performance correlation guidelines; and (iii) determining one or more backend performance correlation conclusions based on the one or more backend configuration data artefacts, the one or more backend performance data artefacts, and the one or more backend performance correlation guidelines. In at least some embodiments, a backend performance data artefact associated with a monitored backend device is any data artefact that (directly or when analyzed and in whole or in part) provides at least one piece of information about a performance metric (e.g., one or more of speed, latency, redundancy, and reliability) associated with the monitored backend device. In at least some embodiments, a backend performance correlation guideline is any one or more computer instructions that (directly or when analyzed and in whole or in part) determine whether the configured backend device (associated with the one or more backend configuration data artefacts) is associated with the monitored backend device (associated with the one or more backend performance data artefacts). In at least some embodiments, a performance correlation conclusion is a collection of one or more data artefacts that (directly or when analyzed and in whole or in part) indicate whether the configured backend device is associated with the monitored backend device.

In some embodiments, the one or more backend configuration data artefacts comprise at least one configured device identification data artefact; the one or more backend performance data artefacts comprise at least one monitored device identification data artefact; and determining the one or more backend performance correlation conclusions is performed based on the at least configured device identification data artefact and the at least one monitored device identification data artefact (e.g., based on whether the at least one configured device identification data artefact and the at least one monitored device identification data artefact correspond to each other according to the one or more backend performance correlation guidelines). In at least some embodiments, a configured device identification artefact is any data artefact that (directly or when analyzed and in whole or in part) indicate one or more pieces of information about the identity and/or one or more identifying properties of the configured backend device. In at least some embodiments, a monitored device identification artefact is any data artefact that (directly or when analyzed and in whole or in part) indicate one or more pieces of information about the identity and/or one or more identifying properties of the monitored backend device.

In some embodiments, the performance monitoring program further determines one or more client-based performance correlation conclusions based on the one or more configuration correlation conclusions and the one or more backend performance correlation conclusions. The program further determines one or more performance monitoring conclusions selected from the group consisting of: (i) one or more client transaction configuration conclusions; (ii) one or more client transaction performance conclusions; and (iii) one or more backend service performance conclusions. The one or more client transaction configuration conclusions are determined based on the one or more configuration correlation conclusions. The one or more client transaction performance conclusions are determined based on the one or more client-based performance correlation conclusions. The one or more backend service performance conclusions are determined based on the one or more backend performance correlation conclusions.

In at least some embodiments, a client-based performance correlation conclusion is a collection of one or more data artefacts that (directly or when analyzed and in whole or in part) indicate whether the client device is associated with the monitored backend device. In some embodiments, determining the one or more client-based performance correlation conclusions is performed based on one or more client-based performance correlation guidelines. In at least some embodiments, a client-based performance correlation guideline is any one or more computer instructions that (directly or when analyzed and in whole or in part) determine whether the client device is associated with the monitored backend device.

In at least some embodiments, a client transaction configuration conclusion is a collection of one or more data artefacts determined to indicate all the backend computing resources used by the client device in a period of time (e.g., one month). In at least some embodiments, a client transaction performance conclusion is a collection of one or more data artefacts determined to indicate at least one measure (e.g., average, median, and/or mode) of at least one performance metric associated with all the backend computing resources used by the client device in a period of time (e.g., one month). In at least some embodiments, a backend service performance conclusion is a collection of one or more data artefacts determined to indicate at least one measure (e.g., average, median, and/or mode) of all performance metric associated with the configured backend device.

In some embodiments, the performance monitoring program determines one or more performance conclusions based on the one or more configuration correlation conclusions and the one or more backend performance correlation conclusions. In at least some embodiments, a performance conclusion is a collection of one or more data artefacts determined to indicate at least one piece of information about the configuration and/or performance of the computer system within which the program operates.

In general, one or more steps associated with different embodiments of the performance monitoring program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the performance monitoring program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

In some embodiments, the performance monitoring program operates on the client device. In at least some of those embodiments, the program identifies one or more client-based data artefacts through receiving those artefacts from client applications and/or through instrumentation. The program identifies one or more backend configuration data artefacts and/or one or more backend performance data artefacts from one or more devices other than the client device, such as the configured backend device, the monitored backend device, and/or one or more devices managing and/or operating on at least one configured backend device and/or at least one monitored backend device.

In other embodiments, the performance monitoring program operates on at least one device other than the client device, the configured backend device, the monitored backend device, and/or one or more devices managing and/or operating on at least one configured backend device and/or at least one monitored backend device. The program identifies one or more client-based data artefacts, one or more backend configuration data artefacts, and/or one or more backend performance data artefacts through monitoring network communications between the client device, the configured backend device, the monitored backend device, and/or one or more devices managing and/or operating on at least one configured backend device and/or at least one monitored backend device (e.g., through port mirroring).

In some embodiments, the performance monitoring program is associated with at least one of a data layer for storing, analyzing, and/or preprocessing one or more client-based data artefacts, one or more backend configuration data artefacts, and/or one or more backend performance data artefacts; and an analytical engine for determining one or more configuration correlation conclusions, one or more backend performance correlation conclusions, one or more client-based performance correlation conclusions, and/or one or more performance monitoring conclusions using one or more backend configuration correlation conclusions and one or more data artefacts from the data stored, analyzed, and/or preprocessed by the data layer.

Aspects of the present invention enable measuring performance of computing resources using limited amount of data (e.g., client-based data, backend configuration data and optionally backend performance data). The inventors recognized the problem of excessive data gathering in measuring the performance of computing resources, as such excessive data gathering increases cost of performance measurement, the possibility of error in performance measurement, and the possibility that complications resulting from lack of access to parts of a client-server domain because of ownership and/or permission issues would arise during performance measurement. As such, aspects of the present invention take away the need for such excessive data gathering practices in accomplishing performance measurement of computing resources, although additional data can enhance the performance measurement done by embodiments of the present invention and is nevertheless useful. Nevertheless, the aforementioned advantages are not required to be present in all of the embodiments of the invention and may not be present in all of the embodiments of the invention.

Figure 8:
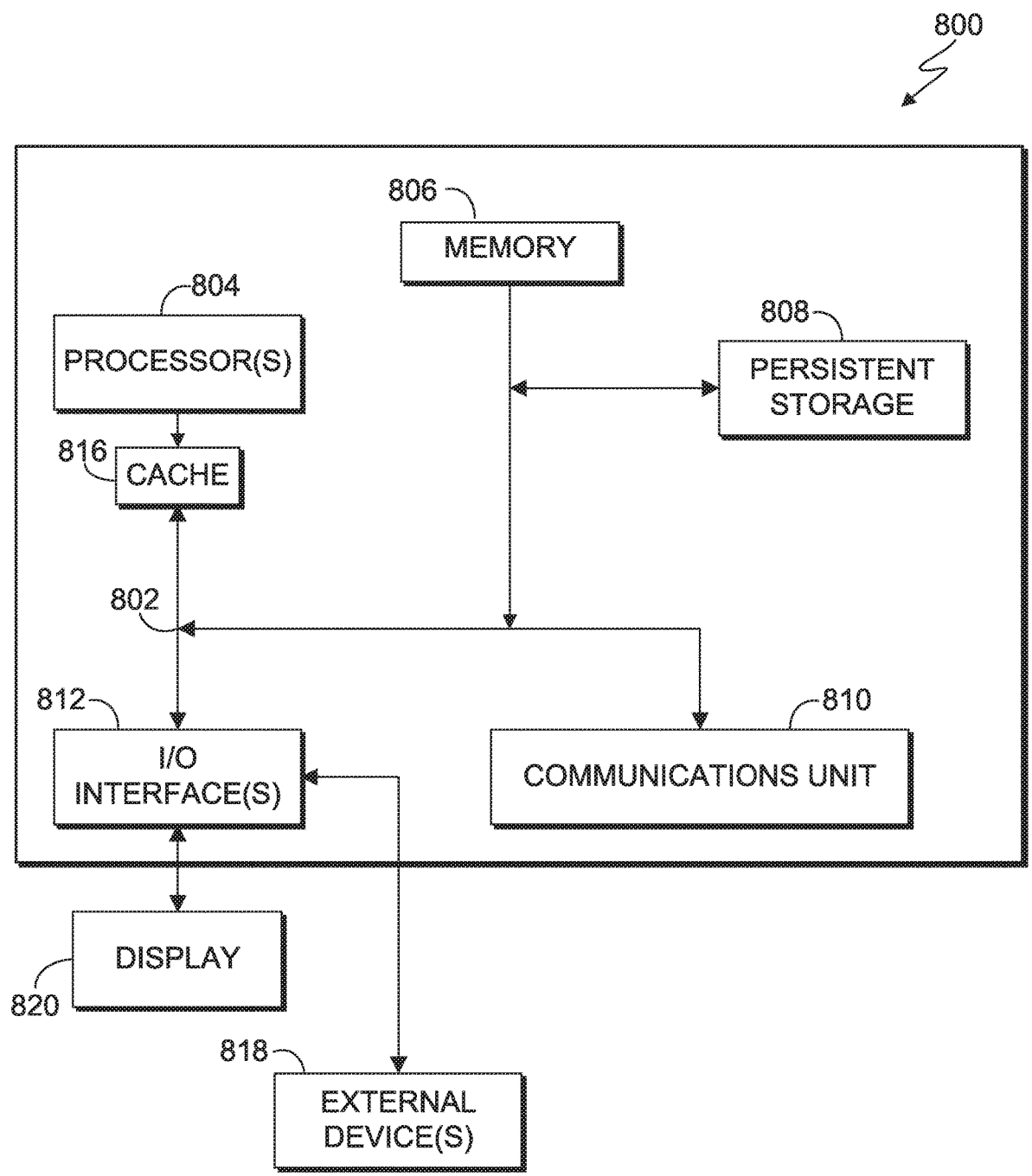
FIG. 8 is a block diagram of a computing apparatus suitable for executing a performance monitoring program, in accordance with at least one embodiment of the present invention.

FIG. 8 is a block diagram depicting components of a computer 800 suitable for executing a performance monitoring program. FIG. 8 displays the computer 800, the one or more processor(s) 804 (including one or more computer processors), the communications fabric 802, the memory 806, the RAM, the cache 816, the persistent storage 808, the communications unit 810, the I/O interfaces 812, the display 820, and the external devices 818. It should be appreciated that FIG. 8 provides only an illustration of one embodiment and does not imply any limitations with regard to the environments in which different embodiments may be implemented. Many modifications to the depicted environment may be made.

As depicted, the computer 800 operates over a communications fabric 802, which provides communications between the cache 816, the computer processor(s) 804, the memory 806, the persistent storage 808, the communications unit 810, and the input/output (I/O) interface(s) 812. The communications fabric 802 may be implemented with any architecture suitable for passing data and/or control information between the processors 804 (e.g., microprocessors, communications processors, and network processors, etc.), the memory 806, the external devices 818, and any other hardware components within a system. For example, the communications fabric 802 may be implemented with one or more buses or a crossbar switch.

The memory 806 and persistent storage 808 are computer readable storage media. In the depicted embodiment, the memory 806 includes a random access memory (RAM). In general, the memory 806 may include any suitable volatile or non-volatile implementations of one or more computer readable storage media. The cache 816 is a fast memory that enhances the performance of computer processor(s) 804 by holding recently accessed data, and data near accessed data, from memory 806.

Program instructions for the return suggestion determination program may be stored in the persistent storage 808 or in memory 806, or more generally, any computer readable storage media, for execution by one or more of the respective computer processors 804 via the cache 816. The persistent storage 808 may include a magnetic hard disk drive. Alternatively, or in addition to a magnetic hard disk drive, the persistent storage 808 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of the persistent storage 808.

The communications unit 810, in these examples, provides for communications with other data processing systems or devices. In these examples, the communications unit 810 may include one or more network interface cards. The communications unit 810 may provide communications through the use of either or both physical and wireless communications links. The return suggestion determination program may be downloaded to the persistent storage 808 through the communications unit 810. In the context of some embodiments of the present invention, the source of the various input data may be physically remote to the computer 800 such that the input data may be received and the output similarly transmitted via the communications unit 810.

The I/O interface(s) 812 allows for input and output of data with other devices that may operate in conjunction with the computer 800. For example, the I/O interface 812 may provide a connection to the external devices 818, which may include a keyboard, keypad, a touch screen, and/or some other suitable input devices. External devices 818 may also include portable computer readable storage media, for example, thumb drives, portable optical or magnetic disks, and memory cards. Software and data used to practice embodiments of the present invention may be stored on such portable computer readable storage media and may be loaded onto the persistent storage 808 via the I/O interface(s) 812. The I/O interface(s) 812 may similarly connect to a display 820. The display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying, through port mirroring, one or more client-based data artefacts including a request priority, said one or more client-based data artefacts being associated with a client device, by injecting, inserting, and gathering data based, at least in part, on a geographic location of the client device, from one or more applications utilized by the client device to insert client data not inserted by default into service requests by the one or more applications;
identifying one or more backend configuration data artefacts, said one or more backend configuration data artefacts being associated with a configured backend device;
identifying one or more backend configuration correlation guidelines based on a type and location of data accessed by the client device request; and
determining one or more configuration correlation conclusions based on said one or more client-based data artefacts, said one or more backend configuration data artefacts, and said one or more backend configuration correlation guidelines;
wherein:
said one or more client-based data artefacts comprise at least one client input data artefact supplied as a query string in a hypertext transfer protocol request; and
said determining one or more configuration correlation conclusions is performed based on said at least one client input data artefact.

2. The computer-implemented method of claim 1, wherein:
said one or more client-based data artefacts comprise at least one client service request data artefact;
said one or more backend configuration data artefacts comprise at least one backend service delivery data artefact; and
determining said one or more configuration correlation conclusions is performed based on said at least one client service request data artefact and said at least one backend service delivery data artefact.

3. The computer-implemented method of claim 1, wherein identifying said one or more client-based data artefacts comprises:
identifying a hypertext transfer protocol request, said hypertext transfer protocol request being associated with said client device;
determining one or more client-based data indications based on said hypertext transfer protocol request; and
determining said one or more client-based data artefacts based on said one or more client-based data indications.

4. The computer-implemented method of claim 1, further comprising:
identifying one or more backend performance data artefacts, said one or more backend performance data artefacts being associated with a monitored backend device;
identifying one or more backend performance correlation guidelines; and
determining one or more backend performance correlation conclusions based on said one or more backend configuration data artefacts, said one or more backend performance data artefacts, and said one or more backend performance correlation guidelines.

5. The computer-implemented method of claim 4, wherein:
said one or more backend configuration data artefacts comprise at least one configured device identification data artefact;
said one or more backend performance data artefacts comprise at least one monitored device identification data artefact; and
determining said one or more backend performance correlation conclusions is performed based on said at least configured device identification data artefact and said at least one monitored device identification data artefact.

6. The computer-implemented method of claim 4, further comprising:
determining one or more client-based performance correlation conclusions based on said one or more configuration correlation conclusions and said one or more backend performance correlation conclusions; and
determining one or more performance monitoring conclusions selected from the group consisting of:
one or more client transaction configuration conclusions;
one or more client transaction performance conclusions; and
one or more backend service performance conclusions;
wherein:
said one or more client transaction configuration conclusions are determined based on said one or more configuration correlation conclusions;
said one or more client transaction performance conclusions are determined based on said one or more client-based performance correlation conclusions; and
said one or more backend service performance conclusions are determined based on said one or more backend performance correlation conclusions.

7. The computer-implemented method of claim 1, wherein said one or more client-based data artefacts are selected from the group consisting of: (i) a client ID; (ii) a content-length; (iii) an image ID; (iv) a music ID; and (v) a webpage name.

8. A computer program product, comprising one or more computer readable storage media and program instructions stored on said one or more computer readable storage media, said program instructions comprising instructions to:
identify, through port mirroring, one or more client-based data artefacts including a request priority, said one or more client-based data artefacts being associated with a client device, by injecting, inserting, and gathering data based, at least in part, on a geographic location of the client device, from one or more applications utilized by the client device to insert client data not inserted by default into service requests by the one or more applications;

identify one or more backend configuration data artefacts, said one or more backend configuration data artefacts being associated with a configured backend device;

identify one or more backend configuration correlation guidelines based on a type and location of data accessed by the client device request; and determine one or more configuration correlation conclusions based on said one or more client-based data artefacts, said one or more backend configuration data artefacts, and said one or more backend configuration correlation guidelines;

wherein:
said one or more client-based data artefacts comprise at least one client input data artefact supplied as a query string in a hypertext transfer protocol request; and said instructions to determine said one or more configuration correlation conclusions is performed based on said at least one client input data artefact.

9. The computer program product of claim 8, wherein:
said one or more client-based data artefacts comprise at least one client service request data artefact;
said one or more backend configuration data artefacts comprise at least one backend service delivery data artefact; and
said instructions to determine said one or more configuration correlation conclusions is performed based on said at least one client service request data artefact and said at least one backend service delivery data artefact.

10. The computer program product of claim 8, wherein said instructions to identify said one or more client-based data artefacts comprises instructions to:
identify a hypertext transfer protocol request, said hypertext transfer protocol request being associated with said client device;
determine one or more client-based data indications based on said hypertext transfer protocol request; and
determine said one or more client-based data artefacts based on said one or more client-based data indications.

11. The computer program product of claim 8, wherein said program instructions further comprise instructions to:
identify one or more backend performance data artefacts, said one or more backend performance data artefacts being associated with a monitored backend device;
identify one or more backend performance correlation guidelines; and
determine one or more backend performance correlation conclusions based on said one or more backend configuration data artefacts, said one or more backend performance data artefacts, and said one or more backend performance correlation guidelines.

12. The computer program product of claim 11, wherein:
said one or more backend configuration data artefacts comprise at least one configured device identification data artefact;
said one or more backend performance data artefacts comprise at least one monitored device identification data artefact; and
said instructions to determine said one or more backend performance correlation conclusions is performed based on said at least configured device identification data artefact and said at least one monitored device identification data artefact.

13. The computer program product of claim 11, wherein said program instructions further comprise instructions to:
determine one or more client-based performance correlation conclusions based on said one or more configuration correlation conclusions and said one or more backend performance correlation conclusions; and determine one or more performance monitoring conclusions selected from the group consisting of:
one or more client transaction configuration conclusions;
one or more client transaction performance conclusions; and
one or more backend service performance conclusions;
wherein:
said one or more client transaction configuration conclusions are determined based on said one or more configuration correlation conclusions;
said one or more client transaction performance conclusions are determined based on said one or more client-based performance correlation conclusions; and
said one or more backend service performance conclusions are determined based on said one or more backend performance correlation conclusions.

14. The computer program product of claim 8, wherein said one or more client-based data artefacts are selected from the group consisting of: (i) a client ID; (ii) a content-length; (iii) an image ID; (iv) a music ID; and (v) a webpage name.

15. A computer system comprising:
a processor;
one or more computer readable storage media;
computer program instructions;
said computer program instructions being stored on said one or more computer readable storage media; and
said computer program instructions comprising instructions to:
identify, through port mirroring, one or more client-based data artefacts including a request priority, said one or more client-based data artefacts being associated with a client device, by injecting, inserting, and gathering data based, at least in part, on a geographic location of the client device, from one or more applications utilized by the client device to insert client data not inserted by default into service requests by the one or more applications;
identify one or more backend configuration data artefacts, said one or more backend configuration data artefacts being associated with a configured backend device;
identify one or more backend configuration correlation guidelines based on a type and location of data accessed by the client device request; and
determine one or more configuration correlation conclusions based on said one or more client-based data artefacts, said one or more backend configuration data artefacts, and said one or more backend configuration correlation guidelines;
wherein:
said one or more client-based data artefacts comprise at least one client input data artefact supplied as a query string in a hypertext transfer protocol request; and
said instructions to determine said one or more configuration correlation conclusions is performed based on said at least one client input data artefact.

16. The computer system of claim 15, wherein:
said one or more client-based data artefacts comprise at least one client service request data artefact;

said one or more backend configuration data artefacts comprise at least one backend service delivery data artefact; and said instructions to determine said one or more configuration correlation conclusions is performed based on said at least one client service request data artefact and said at least one backend service delivery data artefact.

17. The computer system of claim 15, wherein said instructions to identify said one or more client-based data artefacts comprises instructions to:

identify a hypertext transfer protocol request, said hypertext transfer protocol request being associated with said client device;

determine one or more client-based data indications based on said hypertext transfer protocol request; and determine said one or more client-based data artefacts based on said one or more client-based data indications.

18. The computer system of claim 15, wherein said computer program instructions further comprise instructions to:

identify one or more backend performance data artefacts, said one or more backend performance data artefacts being associated with a monitored backend device;

identify one or more backend performance correlation guidelines; and determine one or more backend performance correlation conclusions based on said one or more backend configuration data artefacts, said one or more backend performance data artefacts, and said one or more backend performance correlation guidelines.

19. The computer system of claim 18, wherein said computer program instructions further comprise instructions to:

determine one or more client-based performance correlation conclusions based on said one or more configuration correlation conclusions and said one or more backend performance correlation conclusions; and determine one or more performance monitoring conclusions selected from the group consisting of:

one or more client transaction configuration conclusions;

one or more client transaction performance conclusions; and one or more backend service performance conclusions;

wherein:

said one or more client transaction configuration conclusions are determined based on said one or more configuration correlation conclusions;

said one or more client transaction performance conclusions are determined based on said one or more client-based performance correlation conclusions; and said one or more backend service performance conclusions are determined based on said one or more backend performance correlation conclusions.

20. The computer system of claim 15, wherein said one or more client-based data artefacts are selected from the group consisting of: (i) a client ID; (ii) a content-length; (iii) an image ID; (iv) a music ID; and (v) a webpage name.

* * * * *